US008010944B1

(12) United States Patent
Kilgard et al.

(10) Patent No.: US 8,010,944 B1
(45) Date of Patent: Aug. 30, 2011

(54) VECTOR DATA TYPES WITH SWIZZLING AND WRITE MASKING FOR C++

(75) Inventors: Mark J. Kilgard, Austin, TX (US); Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1258 days.

(21) Appl. No.: 11/608,764

(22) Filed: Dec. 8, 2006

(51) Int. Cl.
*G06F 9/44* (2006.01)
(52) U.S. Cl. ........................................ 717/116; 717/108
(58) Field of Classification Search ................... None
See application file for complete search history.

(56) References Cited

U.S. PATENT DOCUMENTS

| | | | | |
|---|---|---|---|---|
| 5,652,874 | A * | 7/1997 | Upson et al. | 716/11 |
| 5,680,619 | A * | 10/1997 | Gudmundson et al. | 717/108 |
| 5,694,578 | A * | 12/1997 | Upson et al. | 710/73 |
| 5,923,877 | A * | 7/1999 | Berner et al. | 717/108 |
| 6,063,128 | A | 5/2000 | Bentley et al. | |
| 7,120,899 | B1 * | 10/2006 | Sievert | 717/116 |
| 7,286,133 | B2 | 10/2007 | Kilgard et al. | |
| 7,548,238 | B2 | 6/2009 | Berteig et al. | |
| 2005/0122331 | A1 | 6/2005 | Boyd et al. | |
| 2007/0186210 | A1 | 8/2007 | Hussain et al. | |
| 2009/0089763 | A1 | 4/2009 | Chen et al. | |

OTHER PUBLICATIONS

McCool et al., Sh Reference Manual, published May 29, 2004, p. 1-12.*
Zheng Qin, An Embedded Shading Language, Waterloo Ontario, Canada, 2004, pp. 1-133.*
Al Dev, C++ Programming How-To, V41.3, Feb. 7, 2002, pp. 1-22.*
Todd L. Veldhuizen C++ Templates as Partial Evaluation, 1999, pp. 1-6.*
McCool et al., Shader Metaprogramming, The Eurographics Association 2002, pp. 57-68.*
Luebke et al., GPGPU: General Purpose Computation on Graphics Hardware, published on SIGGRAPH 2004, pp. 1-289.*
Goetz et al., An XML-based Visual Shading Lnaguage for Vertex and Fragment Shaders, published on ACM 2004, pp. 87-97 and p. 184.*
Mark et al., Cg: A system for programming graphics hardware in a C-like language, published on ACM 2003, pp. 896-907.*
"Cg Toolkit User's Manual" (Version 1.4), Sep. 2005, p. 22 and pp. 245-246 of the Appendix A specification for Cg: http://http.download.nvidia.com/developer/cg/Cg_1.4/Docs/CG_UserManual_1-4.pdf.
Microsoft's "Per-Component Math Operations (DirectX HLSL)" documentation, Vector and Matrix Type: http://msdn2.microsoft.com/en-us/library/bb509634(d=printer).aspx.

(Continued)

*Primary Examiner* — Thuy Dao
*Assistant Examiner* — Zheng Wei
(74) *Attorney, Agent, or Firm* — Patterson & Sheridan, LLP

(57) ABSTRACT

One embodiment of the invention includes a method for extending an object-oriented programming language to include support for a shading language vector data type. The method generally includes defining a template class for a shading language vector, defining a template class for a swizzled vector, and partially specializing the vector template class for vectors of one, two, three, and four elements. The partial specialization includes a union of instances of the vector swizzle template, where each instance represents a desired vector swizzle. In addition to defining the vector and vector swizzle data types, the templates classes may overload operators provided by the object-oriented programming language to perform operations corresponding to operations of the operators in the shading language.

26 Claims, 7 Drawing Sheets

OTHER PUBLICATIONS

John Kessenich et al., "The OpenGL Shading Language" specification, Language Version 1.10, Apr. 30, 2004, section 5.5 (pp. 29-31): http://oss.sgi.com/projects/ogl-sample/registry/ARB/GLSLangSpec.Full.1.10.59.pdf.

Randima Fernando et al., "The Cg Tutorial: The Definitive Guide to Programmable Real-Time Graphics", pp. 113-115, Addison-Wesley, Boston, MA, USA, 2003, ISBN: 0-321-19496-9.

Office Action, U.S. Appl. No. 11/608,766, dated Nov. 10, 2010.

* cited by examiner

```
1  /*fragment of cgVector header file showing
2  *base definition for shader language vector data type */
3
4  template <typename T, int N>
5  struct cgVector{};
6
7  //base definition for swizzled vector data type           135
8
9  template <typename T, int STORAGE, int N, unsigned int SMASK>
10 struct cgVectorSwizzle {
11
12      T v[STORAGE];
13
13      //overloaded [] operator for swizzled indexing based on SMASK
14
15      T &operator [] (int i) {return v[(SMASK >> (8*i)) & 0xFF];}
16      const T &operator [] (int i) const {return v[(SMASK >> (8*i)) & 0xFF];}
17
18      //overloaded assignment operator for assigning cgVector
19      //to writemask
20
21      cgVectorSwizzle& operator = (const cgVector<T,N> &ind) {
22         cgVector<T,N> tmp;
23         for (int i=0; i<N;i++)
24             tmp[i]=ind[i];
25         for (int i=0;i<N;i++)
26             (*this[i] = tmp[i]);
27         return (*this);
28      }
29
30      //other overloarded operators for each possible operand combination of
31      //cgVector, cgVectorSwizzle, and scalar type T */
32
33 };
```

FIG. 3

```
1  /*fragment of cgVector header file showing partial specialization of the
2   *cgVector data type for a vector with two scalar components */
3
4  template <typename T>
5  struct cgVector<T,2> {
6   union {
7        //single component swizzles
8    cgVectorSwizzle <T,2,1,0x00> x;                      135
9    cgVectorSwizzle <T,2,1,0x01> y;
10
11   //two component swizzles
12   const cgVectorSwizzle <T,2,2,0x0000> xx;
13   const cgVectorSwizzle <T,2,2,0x0101> yy;
14   cgVectorSwizzle <T,2,2,0x0100> xy;
15   cgVectorSwizzle <T,2,2,0x0001> yx;
16
17   //three component swizzles
18   const cgVectorSwizzle<T,2,3, 0x010000> xxy;
19   const cgVectorSwizzle<T,2,3, 0x000101> yyx;
20
21   //four component swizzles
22   const cgVectorSwizzle<T,2,3, 0x00010001> yxyx;
23   const cgVectorSwizzle<T,2,3, 0x00000000> xxxx;
24
25   /* many additional three and four component swizzles
26        and CgVectorSwizzle union members for for .rgba and
27          .stpq variations */
28   };
29
30    cgVector(const T & v0, const T & v1) {
31     xy[0] = v0;
32     xy[1] = v1;
33  }
34
35    cgVector(void) {
36     xy[0]= 0;
37     xy[1]= 0;
38  }
39  //additional overloaded operators for cgVector<T,2> partial specialization
40  };
41
42   typedef cgVector<float, 1> float1;
43   typedef cgVector<float, 2> float2;
44   typedef cgVector<float, 3> float3;
45   typedef cgVector<float, 4> float4;
46   //additional typedef aliases for int, bool, and matrix data types
47
48   // sample code fragment using shader language vector data types
49
50   #include "cgVector.h"
51   int main (void) {
52    float2 vec_one(1,2);
53    cgVector<float,2> vec_two;
54    vec_two.yx = vec_one;
55    return 0;
56  }
```

FIG. 4

```
1   /*Sample program showing use of cgVector and cgVectorSwizzle data types */
2
3   int main(void) {              135
4       #include "cgVector.h"
5
6       //variables for operator overloading examples
7
8       float3 foo(2,3,4);
9       float3 bar;                                           500
10      float3 cross;
11      float2 pair;
12      float1 single;
13      float average;
14      int count;
15
16      //cgVector<T,N>  and cgVector<T,N>  examples
17      bar = foo;
18
19      //cgVectorSwizzle<T,N,SMASK> and cgVectorSwizzle<T,N,SMASK> examples
20      foo.xyz = bar.zyz;
21
22      //cgVector<T,N> and CgVectorSwizzle<T,N,SMASK> examples
23      pair = foo.xy;
24      bar.xy = pair;
25
26      //cgVector<T,N> and scalar data type examples
27      single = 5;
28      count = (int)single;
29
30      //CgVectorSwizzle<T,N,SMASK> and scalar data type examples
31      foo.x = 5;
32      average = (foo.x + bar.x)/2;
33
34      //cross product of two three component vectors
35      cross = foo.yzx * bar.zxy - foo.zxy * bar.yzx;
36      return 0;
37  }
```

FIG. 5

VECTOR DATA TYPES WITH SWIZZLING AND WRITE MASKING FOR C++

BACKGROUND OF THE INVENTION

1. Field of the Invention

Embodiments of the present invention generally relate to computer programming and more specifically to methods for providing vector data types that support swizzling and write masking operations in an object-oriented programming language.

2. Description of the Related Art

Graphics hardware includes graphics processing units (GPUs). GPUs provide a processor capable of executing instructions that generate images produced on a display device. This includes performing calculating values related to lighting effects, object transformations and 3D motion. Shading language programs may be developed and compiled for execution on the GPU. Because many graphics related operations are very vector intensive, the hardware instructions generated from a shading language program may be heavily optimized for vector processing.

Additionally, GPU shading languages such as Cg, HLSL, and the OpenGL Shading Language (GLSL) each include built in support for vector data types. These shading languages also provide a simple and elegant syntax for vector operations referred to as "swizzling" and "write masking." Swizzling allows a developer of a shading language program to specify an ordering of some (or all) of the components of a vector to use in a particular operation. For example, consider the vector <1, 2, 3, 4>, a "swizzle" of this vector may reorder the elements of this vector as <4, 3, 2, 1>, <4, 4, 4, 4>, <4, 2>, <1> or any other combination. In shading languages, a vector may be swizzled by suffixing a vector variable with a swizzle pattern. The swizzle pattern uses a different character to specify each component of a vector. For example, the swizzle patterns for the vectors listed above are "xyzw" for the unswizzled vector and "wzyx," "wwww," "wy," and "x," respectively for the swizzled ones. When a swizzle pattern suffixes a vector being assigned values, the swizzle pattern operates as a write mask. A write mask specifies which vector components an assignment operation should write to. For example, the write mask of "wzyx" specifies to assign values to a vector in reverse order. As another example, the write mask "yz" specifies to assign values to the y and z components of a vector, leaving other values unchanged.

The common syntax adopted by Cg, HLSL, and GLSL for swizzling and write masking operations have proven to be both very succinct and very powerful for vector manipulation. Accordingly, providing support for the syntax of swizzling and write masking operations for other programming languages would extend the usefulness of these languages. However, most object-oriented languages, including C++, lack a built in vector data type. Such types may be declared as a class, and the C++ standard template library includes a vector type. The vector data types provided by these mechanisms lack support for the shading language syntax for swizzling and write masking operations. Further, the syntax of a vector swizzle (i.e., foo.xxy) conflicts with the syntax for class or structure member accesses in C++(and other object-oriented programming languages). That is, the vector swizzle of "foo.xxy" appears to a C++ compiler as an attempt to access a member variable "xxy" of the object "foo." Similarly, when used as the left value for an assignment operation, the write mask "foo.xz" appears to the C++ compiler as an assignment to the member variable "xy" of the object "foo."

One approach to supporting swizzle and write mask vector operations is to modify a compiler for an object-oriented language to include a vector data type which supports swizzling and write masking. In most cases, this is not possible as users are unable to modify most commercially available compilers. Furthermore, this approach requires each compiler be modified individually.

Also, one difficulty faced by the developer of shading language programs is debugging. Because shading language programs are executed on the GPU, the output of a given program may be observed only indirectly by viewing the images generated by the shading language program. In contrast, object-oriented programming languages, such as C++, have a wide variety of development and debugging tools available. Thus, it would be useful to allow shading language programs to be developed and tested using these tools. However, as described above the vector data types available to the C++ programmer are not interoperable with the shading language vector data types.

As the foregoing illustrates, what is needed in the art is a vector data type for object-oriented programming languages, such as C++, that supports swizzling and write masking operations.

SUMMARY OF THE INVENTION

One embodiment of the present invention is a method for extending an object-oriented programming language to include support for a shading language vector data type. The method includes the steps of defining a first template for a vector data type corresponding to the shading language vector data type. The first template may be parameterized by a scalar component type and a number of scalar components. The method also includes defining a second template for a swizzled vector data type. The second template may be parameterized by the scalar component type, the number of scalar components and a swizzle mask. The method also includes partially specializing the first template for a vector data type having a selected number of scalar components, wherein the partial specialization includes at least a union of instances of the second template, and wherein each instance represents a different vector swizzle. For example, in a graphics programming context, a partial specialization for vectors of one, two, and three components may be provided. In addition to defining the vector and vector swizzle data types the first and second templates may also overload operators provided by the object-oriented programming language to perform operations corresponding to operations of the operators in the shading language.

A vector swizzle returns a vector variable with components in the order specified by a swizzle without changing the actual value of the components for the swizzled vector. To assign values to a vector, a vector swizzle may be used to specify a write mask. A write mask specifies a swizzled selection of vector components to assign values.

One advantage of this method is that it enables developers of shader programs to write, compile, execute and, importantly, debug programs intended for a GPU using a wide variety of development tools available for object-oriented programming languages. Therefore, developers may compose shader programs for the GPU more efficiently and effectively. Similarly, application developers may take advantage of the simple and elegant syntax of the swizzling and write masking operations provided for shading language vector data types when developing any software application in the object-oriented programming language. Thus, providing an interoperable vector data type for both a shading language and an object-oriented programming language increases the utility of both.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates a portion of an exemplary header file used to extend an object-oriented programming language to support shading language vector data types that allow vector swizzling and write masking operations, according to one embodiment of the invention.

FIG. 4 further illustrates aspects of an exemplary header file used to extend an object-oriented programming language to include shading language vector data types, according to one embodiment of the invention.

FIG. 5 illustrates the source code of an example C++ program that uses the shading language vector data types defined by the header file illustrated in FIGS. 3-4, according to one embodiment of the invention.

DETAILED DESCRIPTION

One embodiment of the invention provides a method for extending the capabilities of an object-oriented programming language (e.g., the C++ programming language) to allow users to compile, execute, and debug programs composed in shading languages (e.g., the Cg shading language). More specifically, embodiments of the invention may be used to provide object-oriented programming language with a vector data type that supports the swizzling and write masking operations available for vector data types in shading languages. The method generally includes defining a template class for a shading language vector, defining a template class for a swizzled vector, and partially specializing the vector template class for vectors of one, two, three, and four elements. The partial specialization includes a union of instances of the vector swizzle template, where each instance represents a desired vector swizzle.

Embodiments of the invention are described herein using the C++ programming language as an example of an object-oriented programming language that may be extended to support shading language vector data types. Such vector data types may be configured to support either swizzling or write masking operations (or both). Additionally, embodiments of the invention are described herein using a shading language vector data type that has both the syntax and semantic features of vector data types provided by the Cg shading language. Note, however, the invention is not limited to either the C++ or Cg languages; rather, the invention may provide shading language vector data types for other object-oriented programming languages that support objects, parameterized data types (e.g., templates or generics) and operator overloading. Similarly, the invention may be adapted to provide support for shading language vector data types from a variety of shading languages. For example, one of ordinary skill in the art will readily recognize the adaptability of the C++"cgVector.h" header file described herein for use with the vector data types provided by the GLSL or HLSL shading languages.

Figure 1:
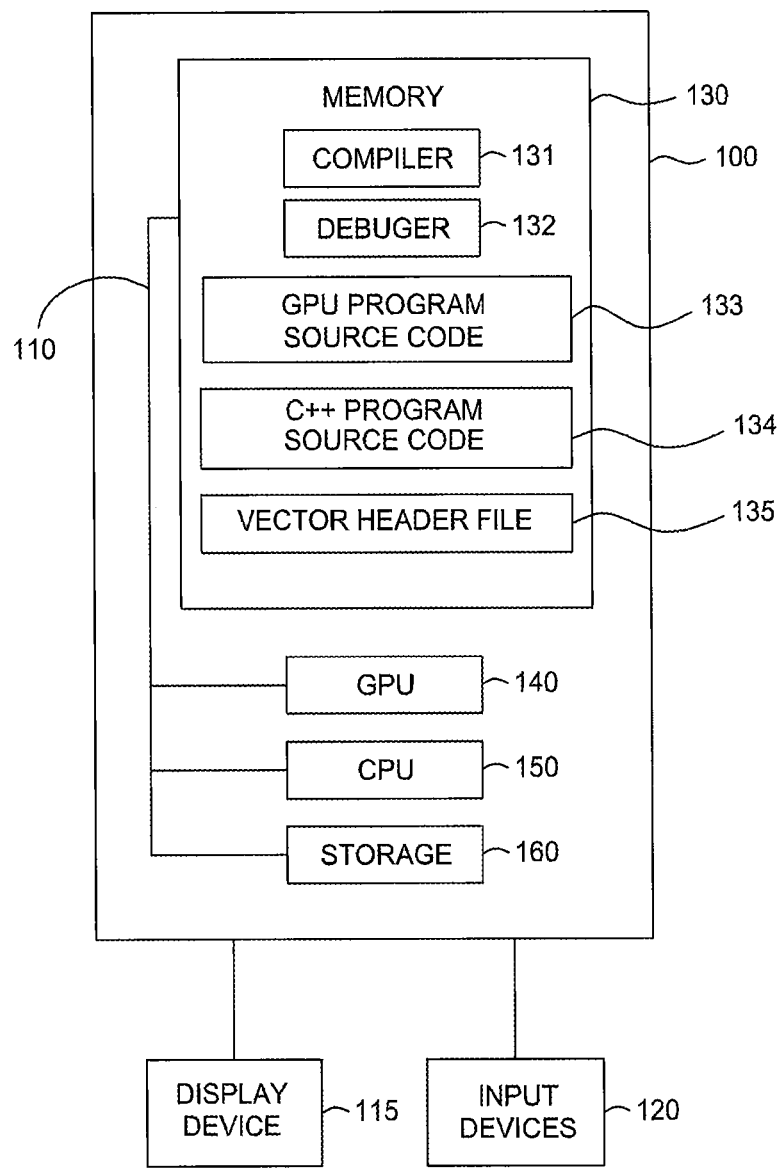
FIG. 1 is a block diagram of a computing system configured to allow a developer to compose object-oriented source code that includes the use of a vector data type having both the syntax and semantics of a vector data types provided by a GPU shading language, according to one embodiment of the invention.

FIG. 1 is a block diagram of a computing system 100 configured to allow a developer to compose, compile, execute, and debug object-oriented source code that includes a vector data type having both the syntax and semantics of vector data types provided by a GPU shading language. Computing system 100 provides a simplified representation of a variety existing computer systems, e.g., a desktop computer, server computer, laptop computer, tablet computer, and the like. Embodiments of the invention, however, are not limited to any particular computing system and may be adapted to take advantage of new computing systems as they become available. Further, embodiments of the invention may be provided as an application program (or programs) stored on computer readable media such as a CD-ROM, DVD-ROM, flash memory module, or may be stored on tangible computer storage media such as a magnetic storage disk. The components of computing system 100 may include software applications executing on distributed systems communicating over computer networks such as local area networks or larger networks such as the Internet.

As shown, computing system 100 is connected to a display device 115 and input devices 120. Input devices 120 typically include a mouse pointing device and keyboard. Display device 115 is typically a CRT or LCD monitor. Computing system 100 includes, without limitation, a central processing unit (CPU) 150, system memory 130, graphics processing unit (GPU) 140, and storage 160. A system bus 110 couples CPU 150 with system memory 130, which is used to store data and programs. Illustratively, system memory 130 includes a complier 131, a debugger 132, shader program source code 133, C++ program source code 134, and a vector header file 135.

GPU 140 may be a processor found on a graphics card, and may be configured to generate the images produced on display device 115. This includes performing calculations such as lighting effects, object transformations, and 3D motion. Because of their specialized nature, GPU 140 is often much faster at performing tasks involving 3D graphics than CPU 150. Further, GPU 140 may be configured to execute micro-code instructions generated by compiling or interpreting shading language program source code 133. Because graphics processing is heavily dependent on manipulating vectors, shading languages typically include built-in support for vector data types. For example, the Cg shading language includes vector data types for vectors of one, two, three, or four scalar components. The scalar components may be floating point numbers, integers, Boolean values or other primitive data types. To declare a vector in shader program source code 133, a developer suffixes the number of scalar components for the desired vector to the scalar data type. For example, the statement "float3 foo;" declares a vector of three floating point numbers with the name "foo." Declaring vectors for storing integer values, Boolean values, etc, may be constructed using this same general pattern.

C++ program source code 134 provides set of programming language instructions for a computer program, library, object or module. C++ program source code 134 may include a single text file, or may include many related files that may be compiled and linked by compiler 131 to create an executable program. Debugger 132 is a software application that assists a developer to detect, and correct errors in C++ program source code 134. Generally, debugger 132 allows the developer to step through the execution of a program compiled from C++ program source code 134 while also monitoring memory, variables values, etc.

In one embodiment, vector header file 135 includes the appropriate declarations and definitions for a vector data type having the syntax and semantic features of a shading language vector. For example, vector header file 135 may allow a developer to declare a vector in C++ program source code 134 of three floating point numbers using the "float3 foo;" syntax described above. Further, vector header file 135 allows a developer to use either swizzling or write masking operations (or both) for vector variables used in C++ program source code 134.

Similarly, including a reference to vector header file 135 in shader program source code 133 may allow compiler 131 to compile shader programs 133 that include references to shading language vectors. Thereafter, a shader program compiled from shader program source code 133 may be executed on CPU 150 and analyzed using debugger 132.

Figure 2:
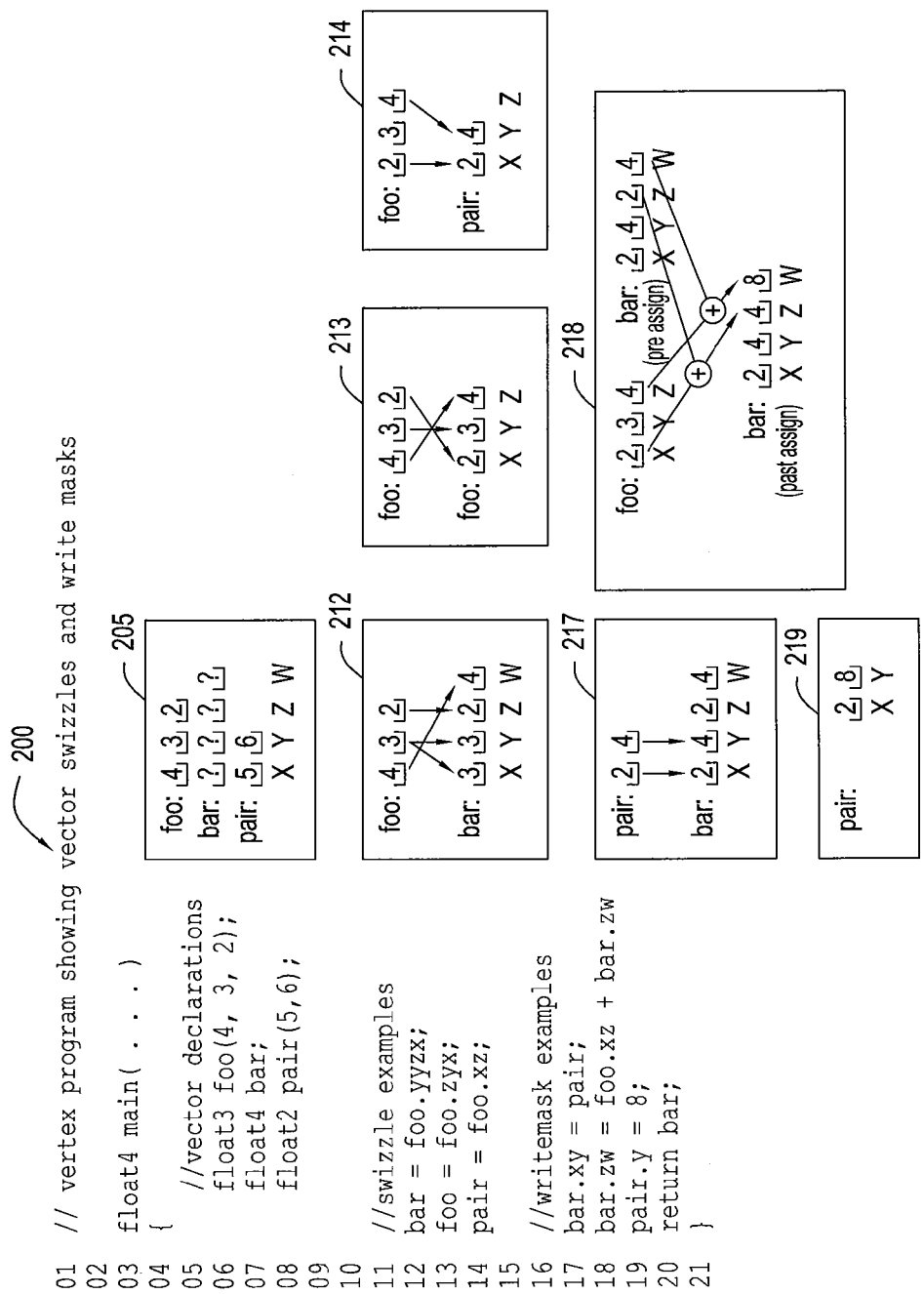
FIG. 2 illustrates an exemplary shader program 200 that includes vector data types using the swizzling and write masking operations provided by a shading language, according to one embodiment of the invention.

FIG. 2 illustrates an exemplary shader program 200 that includes vector data types using the swizzling and write masking operations provided by a shading language, according to one embodiment of the invention. Illustratively, the shader program 200 is written in the Cg shader programming language. Shader program 200 provides an example of vector data type declarations, vector swizzling operations, and vector write masking operations that may be included in shader program source code 133. As used herein, the characters x, y, z, and w are used to reference the first, second, third, and fourth components of a vector, respectively.

Three vectors are declared on lines 6, 7 and 8. Specifically, a float3 vector "foo" is declared on line 6. This vector is initialized to values of <4, 3, 2> for the <x, y, z> components of this vector. A float4 vector "bar" is declared on line 7. The scalar components of this vector are not initialized. A float2 vector "pair" is declared on line 8. This vector is initialized to values of <5, 6> for the <x, y> scalar components of this vector. Lines 11-14 provide examples of swizzle operations performed with these vectors, and lines 16-19 provide examples of write-masking operations performed with these vectors.

Boxes 205-219 illustrate values of these vectors in system memory 130 as the operations specified in lines 11-20 are performed. In boxes 212-219, components from the upper vector are assigned to components of the lower vector. As described herein, the x, y, z, and w characters are used for both vector swizzles and write masks. Typically, the characters chosen for vector swizzles and write masks are based on conventions regarding the data stored in a vector. For example, the x, y, z and w, characters typically correspond to geometric coordinates, the characters r, g, b, and typically correspond to color values, and s, t, p, and q, typically correspond to texture coordinates. In one embodiment, a vector may be swizzled using any of these character sets.

Box 205 shows the values of the scalar components of the "foo," "bar," and "pair" vectors after lines 6-8 have been executed. Lines 12-14 perform assignments of vector swizzles. As shown, the swizzle operator (.) is used to rearrange vector components of a source vector to form a new vector using the syntax of [source vector].[swizzle pattern]. The new vector need not be the same size as the source vector—elements may be repeated or omitted. For example, an assignment to the "bar" vector of a swizzled "foo" vector is specified on line 12. Specifically, the vector swizzle of "foo.yyzx" on line 12 of program 200 includes a swizzle pattern of "yyzx." This pattern specifies a four component vector swizzle composed from the y, y, z, and x values of the "foo" float3 vector, respectively. When line 12 is executed, the swizzled vector "foo.yyzx" (i.e., a vector of <3, 3, 2, 4>) is assigned to the "bar" vector. The effect of this assignment is shown in box 212. Note, although the "foo" variable is a float3 vector, the .yyzx vector swizzle returns a four component vector to assign to the "bar" variable. This illustrates that a vector swizzle pattern may include more scalar components than the source vector.

In the assignment shown on line 12, also note that the "foo" vector remains unchanged. The swizzle operator (.) and swizzle pattern (.yyzx) are used to indicate a swizzled order of scalar components from the "foo" vector to assign to the "bar" vector. The "foo" vector itself is not changed by the assignment operation. Compare this with the assignment on line 13, in which a ".zyx" swizzle of the "foo" vector is assigned back to "foo." The effect of this assignment is shown in box 213, where the ordering of the scalar components of the "foo" vector have been reversed, as specified by the "foo.zyx" swizzle. This example illustrates that a vector may be assigned a swizzle of itself.

In the swizzle example on line 14, the x and y scalar components of the "pair" vector are assigned the x and z components of the "foo" vector. When line 14 is executed, the swizzled vector "foo.xz" is assigned to "pair." The effect of this assignment is shown in box 214. Note that although the "foo" variable is a float3 vector, the ".xz" vector swizzle returns a two component vector to assign to the "bar" vector. This illustrates that a vector swizzle may include fewer scalar components than the source vector.

In each of the swizzle examples on lines 12-14, the right value of the assignment is a vector swizzle and the left value of the assignment one of the vector variables declared on lines 6-8. In addition to the being used to create vector swizzles, the dot operator (.) may be used to define a write mask. Generally, when a swizzled vector is specified as a left value of an assignment, i.e., as the variable being assigned to, the dot operator (.) defines a write mask. A write mask allows a vector (including one generated by vector swizzling) to be assigned to fewer then all of the destination vector's components. Lines 17-19 illustrate three examples of write-masked vector assignments.

First, line 17 illustrates a write mask to the x and y components of the four-component "bar" vector. As shown, line 17 assigns the x and y values of the "pair" vector to the x and y values of the "bar" vector. The effect of this assignment is shown in box 217. Line 18 illustrates a second write mask example. In line 18, the write mask of ".zw" is specified for the "bar" vector. The x and y components of "bar" are unchanged by the assignment. The ".zw" write mask indicates that the results of the vector addition appearing on the right side of the assignment should be written to the z and w scalar components of the "bar" vector. In the example on line 18, the z and w components of the "bar" vector are assigned the sum of the "foo.xz" vector swizzle and the "bar.zw"

vector swizzle. The addition operator (+) is used to perform a component-wise addition of these two vector swizzles. The results of the vector addition and the ".zw" write mask are shown in box 218. Specifically, the z and w components of the "bar" variable are assigned the component wise addition of "foo.x+bar.z" and "foo.z+bar.w," respectively. Lastly, line 19 shows an example of a single-component vector swizzle being assigned a scalar value. The results of this assignment are shown in box 219. The example on line 19 illustrates that a single component vector swizzle may be used interchangeably with the scalar type of the vector.

In each of the operations illustrated in lines 11-19, the assignment operator (=) is used to specify a right value to assign to a left value. Note that in each case, the assignment operates on vectors, vector swizzles or scalar components where both the left and right values have an equal number of vector components. In one embodiment, as long as the left and right values of the assignment expression references variables or expressions that return a vector with the same number of vector components, the assignment is valid. Otherwise, the assignment may be considered invalid, and a compiler error will be generated when such code is compiled. For example, the assignment of "foo=bar" would specify an invalid assignment of a four-component vector to a three-component vector. Similarly, the assignment of "pair" (a two component vector) to the three-component write mask of "foo.yzx" is also invalid.

Additionally, in one embodiment, a write mask may not include the same vector component (e.g., x, y, z or w) more than once in a write mask. For example, the write mask of "foo.xx=pair" is invalid because it is ambiguous which component of the "pair" vector should be assigned to the x component of the "foo" vector. Other operators used with vectors and vector swizzles may have similar requirements. For example, arithmetic operators such as the addition (+) and subtraction (−) operators each may require operands with the same number of vector components.

FIGS. 3-5 illustrate an exemplary C++ header file 135 that allows a developer to use shading language vector data types and to perform swizzling and write masking operations in C++ program source code 134. Further, the exemplary C++ header file 135 illustrates an embodiment that may be used to allow compiler 131 to compile a shader program 133 for execution on CPU 150. In the described embodiment, C++ header file 135 defines vector data types that include support for vector swizzles and write masking that parallels the syntax and semantic features of vector data types provided the Cg shading language.

FIG. 3 illustrates a portion of an exemplary header file 135 used to extend an object-oriented programming language to support shading language vector data types that allow vector swizzling and write masking operations, according to one embodiment of the invention. In this example, header file 135 defines two data types: a "cgVector" data type, and a "cgVectorSwizzle" data type. In one embodiment, the cgVector data type is used to define a shading language vector and the cgVectorSwizzle may be used to provide support for either swizzling or write masking operations (or both). By including header file 135 in program source code 133 a developer may declare variables of type cgVector and perform both vector swizzle and write mask operations like the ones shown in source program 200 of FIG. 2.

As shown, lines 4-5 declare a template for a shading language vector data type named cgVector and lines 9-33 specify a template for a shading language vector swizzle named cgVectorSwizzle. Specifically, lines 4-5 declare a cgVector vector data type template parameterized by the vector's scalar data type (T) and the vector's number of elements (N). Accordingly, when this template is used to declare a variable of type cgVector, the data type (e.g., float, int, Boolean, etc) is specified by supplying a data type for the (T) parameter and the number of components for the vector is specified by supplying a value for the (N) parameter.

In the exemplary header file 135 being described, the "cgVector<T, N>" template is declared without further declaring any data members or functions. Instead, the cgVector<T, N> template may be partially specialized for 1, 2, 3 and 4 (or more) component vectors. This specialization allows header file 135 to provide 1, 2, 3 and 4 component vectors having the syntax and semantic features of shading language vector data types. FIG. 4, described below, illustrates an exemplary specialization of the cgVector<T, N> data type for a two-component vector (i.e., for a specialization of "cgVector<T, 2>").

Lines 9-33 of FIG. 3 define a swizzled vector data type parameterized by the vector's scalar data type (T), the number of components of storage (STORAGE) for the vector being swizzled, the vector's number of elements N, and an additional 32-bit swizzle mask (SMASK). As shown on Line 12, the cgVectorSwizzle data type includes a member array (v) with (STORAGE) elements of type (T). When this template is used, the data type of a cgVectorSwizzle is specified by a "typename T" parameter, and the number of storage elements in the (v) member array is specified by the "int STORAGE" parameter. In one embodiment, the cgVectorSwizzle data type may inherit values for the (T) and (STORAGE) parameters from an instance of cgVector<T, N>, where N becomes STORAGE.

The 32-bit SMASK template parameter may be used to encode the swizzled order of components for a particular vector swizzle. Each byte of the SMASK may be used to determine an index value for accessing the (v) member array according to a particular vector swizzle. In the embodiment being described, the byte at [0.7] of SMASK encodes the index value of the member array (v) for the first component of a swizzled vector. Similarly, the byte at [8.15] of SMASK encodes the index value of the member array (v) for the second component of a swizzled vector, and bytes [16.23] and [24.32] encode the index values for the third and fourth components of a swizzled vector. Note, depending on the value of N for the vector swizzle, fewer than all four bytes of the SMASK may be needed. For example, only the first and second bytes are used for an SMASK encoding of the vector swizzle "foo.yx" (where N is 2) but the first, second, and third bytes are used for an SMASK encoding of the vector swizzle "foo.xww" (where N is 3).

Line 15 illustrates an overloading of the index operator ([ ]). By overloading this operator, when using the index operator ([ ]) values are accessed from the (v) member array according to the SMASK encoding. The "int i" parameter of the ([ ]) operator is used to identify which byte of the vector swizzle to access. The value at this byte of the SMASK is then used to access the (v) member array. For example, the three component vector swizzle "foo.zzy" corresponds to a data type of cgVectorSwizzle<float, 3, 0x010202>. The SMASK provides the actual array (v) element to access for the first, second, and third members of the (v) array (note, the bytes of SMASK are read from right to left) for the swizzled vector, without changing or reordering the actual elements of the array (v). Thus, the statement of foo.zzy[1] access element 2 of the (v) array. When the "1" value is passed to the overloaded ([ ]) operator, the calculated value of ((010202>> (8*1)) & 0xFF) is equal to 2. Thus, the statement foo.zzy[1] actually returns the third element (v[2]) of the (v) member array. Note, the vector swizzle does not change any values of the (v) member array. Instead, the SMASK and overloaded ([ ]) operator allow access to the values of the member array (v) in the order specified by a given vector swizzle.

As another example, consider a four component vector "bar" with values of <9, 10, 11, 12>. The swizzle of "bar.wzyx," reveres the order of bar's scalar components. That is, the swizzle creates a vector with the values of <12, 11, 10, 9>. The following table shows the array values and the encoding of the SMASK parameter for this vector swizzle.

TABLE I values for cgVectorSwizzle of bar.wzyx

| Array Index | Array Value | Swizzle Component | SMASK Byte | SMASK Encoding | Array Index determined from Overloaded ([ ]) | Swizzled Value |
|---|---|---|---|---|---|---|
| v[0] | 9 | w | [0...7] | 03 | v[03] | 12 |
| v[1] | 10 | z | [8...15] | 02 | v[02] | 11 |
| v[2] | 11 | y | [16...23] | 01 | v[01] | 10 |
| v[3] | 12 | x | [24...32] | 00 | v[00] | 9 |

In addition to overloading the index operator ([ ]), lines 21 through 28 illustrate an example overloading of the assignment operator (=) to allow assigning a cgVector<T, N>vector to a cgVectorSwizzle. In other words, the assignment operator (=) is overloaded to allow assignments to a vector swizzled with a write mask. This operator overload allows assignments such as the one on line 17 of shader program 200 of "bar.xy=pair". Further, the overloaded assignment operator (=) utilizes the overloaded index operator ([ ]) to access members of the (v) array, based on the encoded by the SMASK of the particular cgVectorSwizzle member referenced in an assignment operation. As shown, the overloaded assignment operator (=) creates a temporary vector, assigns the swizzled source vector to the temporary vector, and then copies the components of the temporary vector to the destination vector. Using a temporary vector prevents problems that would otherwise occur in a swizzled self assignment (e.g., the assignment of "foo.yzx=foo.yzy;").

In one embodiment, the assignment operator (=) may be overloaded for each possible type of two operands selected from cgVector, cgVectorSwizzle and scalar type (T). Doing so allows each possible assignment between these data types to be used. Further, other operators may be overloaded to allow the cgVector and cgVectorSwizzle data type templates to provide the full range of functionality provided by a shading language vector data type. For example, any (or all) of the increment, decrement, bit-wise shift, or bitwise logical operators may be overloaded by the cgVectorSwizzle vector data type template in a manner similar to the illustrated overloading of the assignment operator (=).

FIG. 4 further illustrates a portion of an exemplary header file 135, according to one embodiment of the invention. More specifically, having defined exemplary cgVector<T, N> and cgVectorSwizzle<T, STORAGE, N, SMASK> data types, FIG. 4 illustrates a partial specialization of cgVector<T, N> for a two component vector. (i.e., a specialization of "cgVector<T, 2>").

As shown, lines 4-5 declare a specialization of the cgVector<T, N> data type template parameterized by a scalar data type (T) for a vector of (2) elements. In this illustrative embodiment, the cgVector<T, 2> data type template includes only one data member. Specifically, the cgVector<T, 2> data type is defined as an anonymous union of cgVectorSwizzles, each parameterized by the scalar data type (T) of cgVector<T, 2> and two constant values. Each cgVectorSwizzle member of the anonymous union inherits the data type (T) supplied to the cgVector<T, N> data type and the integer N to determine the number of components of storage (STORAGE). In one embodiment, a union is used so that a cgVector<T, N> is allocated only enough memory to accommodate the largest union member. Further, using a union causes accesses by any of the cgVectorSwizzle members to the (v) member array reference the same memory. In other words, in the exemplary embodiment being described, memory is allocated for the scalar components of the underlying source vector only once.

The second constant (int N) included in the definition for a cgVectorSwizzle member of the anonymous union specifies how many components are in a vector swizzle corresponding to that member. For example, the x member on line 8 is a single component vector swizzle; the xxy member on line 18 is a three component vector swizzle; and the second constant parameter (N, not STORAGE) for these two cgVectorSwizzle members is 1 and 3, representing vector swizzles of one and three components.

The third constant included in the definition for a cgVectorSwizzle member of the anonymous union specifies a hexadecimal value for the SMASK encoding the correct swizzle pattern for that cgVectorSwizzle. For example the "xx" member of the anonymous union on line 12 includes an SMASK of 0x0000. This SMASK encodes an index value of v[0] and v[0] for the first and second members of the swizzled vector corresponding to the swizzle pattern of ".xx." Similarly, the "yy" member of the anonymous union on line 13 encodes an SMASK of 0x0101 corresponding to the swizzle pattern of ".yy." Using the SMASK encoding, the index values for the first and second members of the swizzled vector are v[1] and v[1]. The SMASK values illustrated for other members of the anonymous union are similarly constructed.

The cgVectorSwizzle members of the anonymous union on lines 8-9 illustrate union members for a single component swizzle member of the cgVector<T, 2> data type (e.g., foo.x and foo.y) and lines 17-19 and 21-23 illustrate three and four component swizzle members of the cgVector<T, 2> data type. As suggested by the comments at lines 25-27, the complete union for the cgVector <T, 2> data type may include a cgVectorSwizzle member for each possible three and four component vector swizzle that may be generated from a two component source vector. Further, the anonymous union may include additional cgVectorSwizzle members for vector swizzles based on r, g, b, a swizzle characters or s, t, p, q swizzle characters, or any other characters that may be useful in a particular case.

In one embodiment, some of the cgVectorSwizzle members of the anonymous union may be defined as constant values. Generally, when a data member is declared as "const," the value of the object cannot be changed after it is initialized. The "const" type may be specified if the swizzle pattern of a cgVectorSwizzle includes any vector component more than once. Thus, as shown on lines 13 and 14, the "yy" member element is declared as "const" while the "xy" element is not. The use of the "const" keyword precludes union elements that are not valid write masks from being used in an assignment. The compiler 131 will generate a compiler error if a value is attempted to be assigned to a cgVectorSwizzle declared as "const," preventing an invalid swizzle pattern from being used in a write mask.

Lines 30-33 and lines 35-38 illustrate two constructors defined for the cgVector<T, 2> data type being described. The first constructor allows users to declare a cgVector<T, 2> variable and initialize the value of its scalar components at the same time, e.g., "cgVector<float, 2> foo (1.2, 4.3)." The second constructor allows users to declare a cgVector<T, 2> variable without initializing any scalar values of the vector, e.g., "cgVector<float, 2> foo." The constructors may be included to match the syntax and semantics of constructors available for vector data types in a shading language.

In one embodiment, additional methods may be provided for copy construction, conversion from other vector data types, conversion from swizzled vector data types, as well as overloaded versions for any (or all) of the index, assignment, increment, decrement, bit-wise shift, or bitwise logical operators available in a shading language. Providing such methods and overloaded operators allows the header file 135 and "cgVector" and "cgVectorSwizzle" data type templates to provide the full range of functionality provided by a shading language vector data type.

Returning to the exemplary header file 135 shown in FIG. 4, lines 42-45 define aliases for the cgVector<float, N> data types to the names float1 float2, foat3 and float4. These type declarations are included to match the data type names in the Cg, GLSL, and HLSL shading languages. Aliases for vectors of integers, Booleans or other data types may be similarly constructed.

Lines 50-55 illustrate an exemplary C++ source program 134 using the cgVector<T, 2> vector data type just described. At line 52, a float2 vector named "vec_one" (1, 2) is declared. This declaration creates a vector storing two floating point numbers initialized to <1, 2>. The typedef on line 43 of FIG. 4 is used to resolve the "float2" alias to the actual type of cgVector<float, 2>. And the constructor on lines 30-33 is used to initialize this vector to the values passed to the constructor. At line 53, a second cgVector<float, 2> vector named "vec_two" is declared. The constructor on lines 35-38 is used to initialize this vector. At line 54, the values of the "vec_two.yx" vector swizzle are assigned to the vec_one vector. To perform this assignment a number of elements of the header file 135 are used. First, the assignment is from a value of type cgVector<float, 2> to a value of type cgVectorSwizzle<float, 2>. Lines 21-28 of FIG. 3 illustrate an overloaded assignment operator (=) that specifies these data types. Thus, this function is instantiated and compiled to perform the assignment. Additionally, the left value of the assignment includes a write mask of ".yx," thus, the cgVectorSwizzle<T, 2, 0x0001> on line 15 of FIG. 4 is used to provide values for T, N and SMASK to the assignment operation. Because this cgVectorSwizzle is a member of an anonymous union, however, it shares access to the member array (v) storing the scalar components of the vec_two vector, thus any changes made to the values of the (v) array of the cgVectorSwizzle<T, 2, 0x0001> data type are reflected in the vec_two vector of type cgVector<float, 2>. Finally, lines 25-27 of the overloaded assignment operator (=) shown in FIG. 3 are used to perform the actual assignment of the scalar components of the vec_one vector to the vec_two.yx vector swizzle. Note, the accesses to the member array (v) on line 26 are performed using the overloaded index operator ([ ]) defined on line 15. Accordingly, accesses to this array are mapped to the index values specified by the SMASK parameter for the .yx swizzle pattern.

One of ordinary skill in the art will recognize that partial specializations of a cgVectorSwizzle<T, 1> data type, a cgVectorSwizzle<T, 3> data type and a cgVectorSwizzle<T, 4> data type may be implemented in manner similar to the cgVectorSwizzle<T, 2> data type. Accordingly, each such partial specialization may declare an anonymous union of each desired vector swizzle built from a 1, 3 or 4 component source vector. Also, partial specializations of the cgVector<T, N> data type for vectors of 1, 3 and 4 scalar components may include the appropriate scalar constructor and account for the use of the appropriate unswizzled member.

FIG. 5 illustrates the source code 500 of an example C++ program that uses the shader language vector data types defined by the header file 135 illustrated in FIGS. 3-4, according to one embodiment of the invention. As shown, the "cgVector.h" header file 135 is included at line 4. Lines 8-13 declare a number of vector data types using the aliases included in the cgVector header file 135. Lines 16-32 illustrate examples of performing assignment operations using these vectors for the various combinations of two operands selected from the cgVector, cgVectorSwizzle and scalar type (T) data types. In each example, the syntax and semantics of these statements match the syntax and semantics of the vector data types provided by the Cg, GLSL and HLSL shading languages. Additionally, line 35 shows a useful application of the cgVector data types to perform a cross product operation on the "foo" and "bar" vectors.

Figure 6:
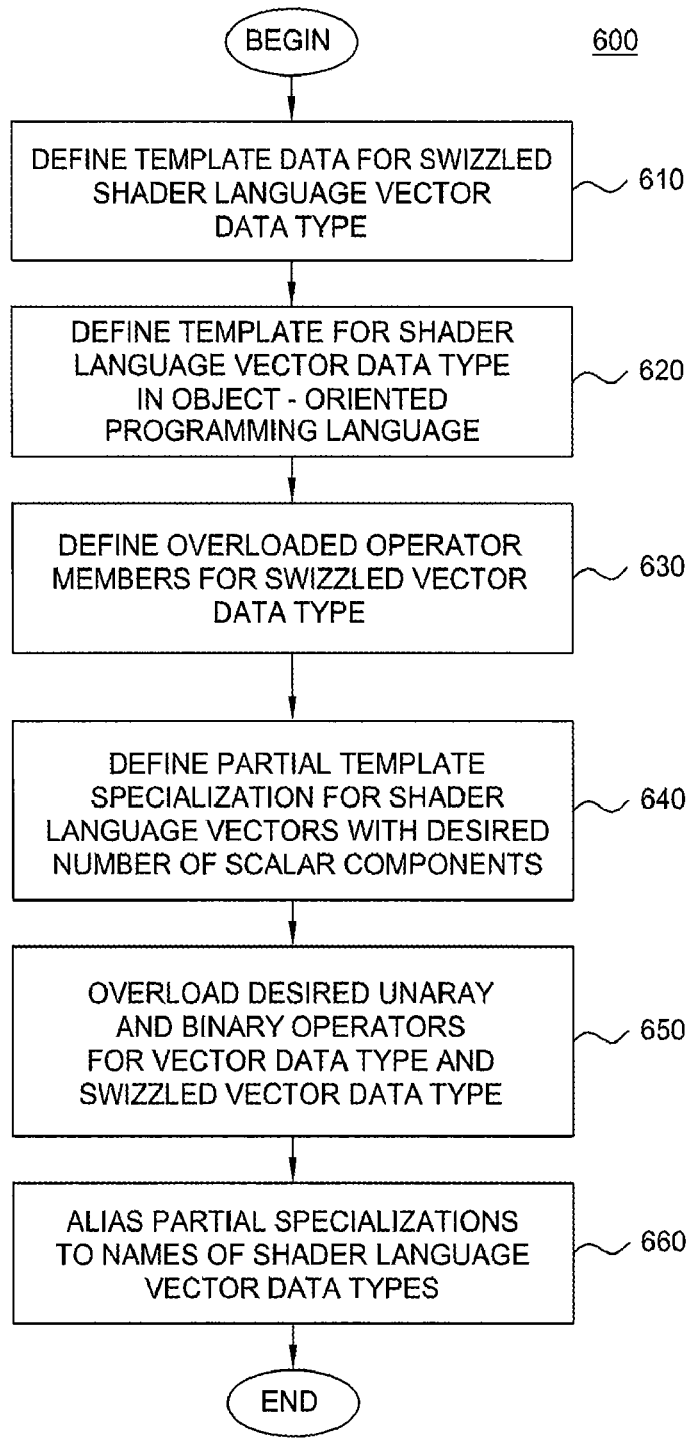
FIG. 6 is a flow diagram illustrating a method for extending a programming language to support shading language vector data types that allow swizzling operations, according to one embodiment of the invention.

FIG. 6 is a flow diagram illustrating a method 600 for extending an object oriented-programming language to include shading language vector data types, according to one embodiment of the invention. In particular, the method 600 may be used to provide a vector data type in an object-oriented programming language supporting swizzling operations on vector variables. Persons skilled in the art will understand that any system configured to perform the method 600 shown in FIG. 6, in any order, is within the scope of the present invention.

The method 600 begins at step 610, where a template is defined for a swizzled vector data type. For example, in the illustrative embodiment described above, the cgVectorSwizzle<T, STORAGE, N, SMASK> template is defined on lines 9-33 of FIG. 3. Like the cgVector<T, N> data type, the cgVectorSwizzle<T, STORAGE, N, SMASK> data type is parameterized by a scalar type, the number of underlying components of storage, and number of scalar components in the swizzle. Additionally, the SMASK template parameter encodes a swizzle for a given instantiation of the cgVectorSwizzle data type. In other words, the SMASK parameter specifies an order for vector components of the swizzled vector. Importantly, the swizzled vector data type does not actually reorder the components of a given vector; instead it specifies a reordering used for the swizzle.

At step 610, a template is defined for a shading language vector data type. For example, in the illustrative embodiment described above, the cgVector<T, N> template is defined on lines 4-5 of FIG. 3. In this embodiment, the cgVector<T, N> template is parameterized by a scalar component type and the number of scalar components in a vector.

At step 630, overloaded operators may be defined for the swizzled vector data type. For example, in the illustrative embodiment described above, the index operator ([ ]) and assignment operator (=) are overloaded on lines 13-28 of FIG. 3. The overloaded index operator ([ ]) is used to map accesses into the array storing vector components to the component specified by the SMASK value. One of skill in the art will recognize that other operators of the object-oriented programming language may be overloaded to provide the syntax and semantic features of the shading language vector data type represented by the vector template defined at step 610. Further, operators may be overloaded to include members for different combinations of vector, vector swizzle and scalar vector component data types, as well as overloaded for "const" and non-"const" vectors.

At step 640, a partial specialization of the shading language vector data type may be defined for vectors with one, two, three and four scalar components. For example, in the illustrative embodiment described above, a partial specialization of the cgVector<T, 2> data type is shown on lines 4-40 of FIG. 4. In this embodiment, the partial specialization includes an anonymous union composed of vector swizzle members; one member for each possible vector swizzle of a one, two, three or four components composed from two scalar elements. Each member of the union supplies the appropriate N and SMASK parameters encoding the number of swizzle components and swizzled ordering for that vector swizzle data type. Additionally, the name given to each union member matches the ordering of the swizzle. Thus, the vector swizzle ".xyxy" on line 22 is given the union member name "xyxy."

At step 650, overloaded operators may be defined for the partial specialization of the vector data type. This may include overloading binary operators such as the addition (+) subtraction (−) operators and unary operators such as the negation operator (!), etc. In one embodiment, two versions of each unary operator may be provided for both the shading language vector data type and the swizzled vector data type, one for a cgVector<T, N> calling the unary operator, and one for a cgVectorSwizzle<T, STORAGE, N, SMASK> calling the unary operator. For the binary operators, eight versions of each operator may be provided to account for the different possible combinations of a vector data type, a swizzled vector data type, and a scalar component type stored in a vector. Lines 16-32 of the program 500 shown in FIG. 5 illustrate an example of several different operand combinations for the assignment operator.

At step 660, the names defined for the vector data type defined at step 610 may be aliased to the names used by a particular shading language vector data type. For example, the typedef statements on lines 43-46 of FIG. 4 show an alias of the cgVector<float, N> data type to the float1, float2, float3 and float4, names used by the Cg shading language. The alias allows a compiler for the object oriented program to support vector swizzling and vector write masks using the syntax and semantics of the vectors data types provided for GPU shader programming languages.

Figure 7:
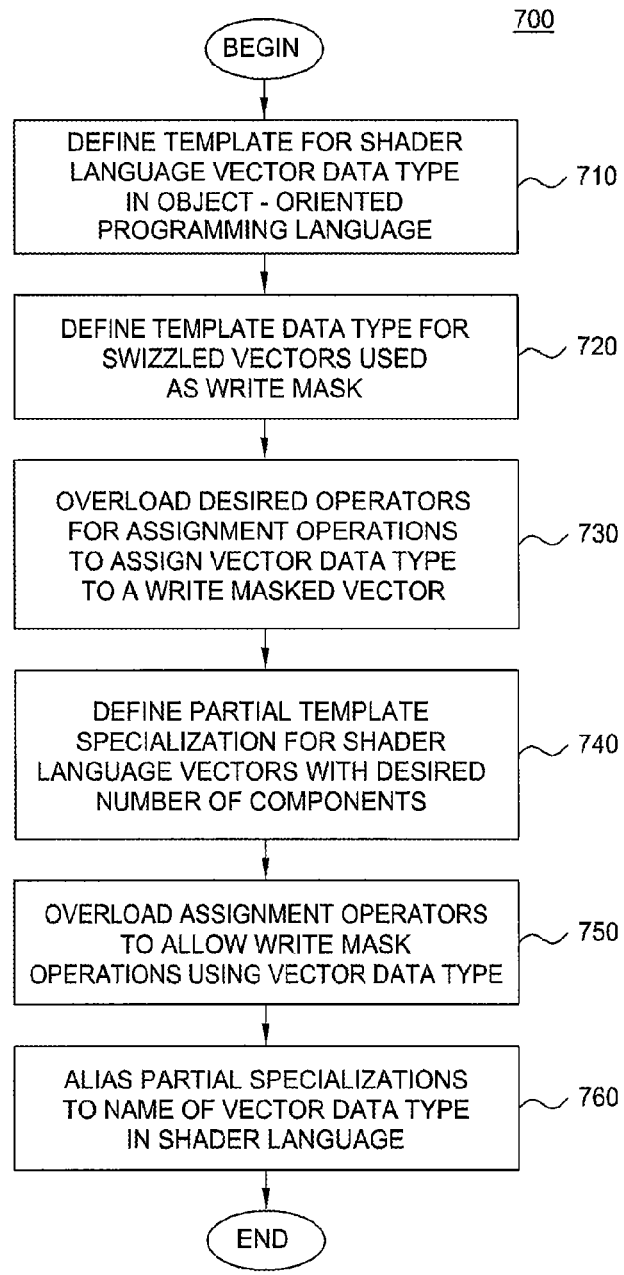
FIG. 7 is a flow diagram illustrating a method for extending an object oriented-programming language to support a vector data type that allows write masked vector assignments, according to one embodiment of the invention.

FIG. 7 is a flow diagram illustrating a method 700 for extending an object oriented-programming language to support shading language vector data types, according to one embodiment of the invention. In particular, the method 700 may be used to provide a vector data type in an object-oriented programming language supporting vector swizzles used as a write-mask in an operation that assigns a value to the vector. Persons skilled in the art will understand that any system configured to perform the method 700 shown in FIG. 7, in any order, is within the scope of the present invention.

In contrast to a vector swizzle which returns a vector variable with components in the order specified by a swizzle without modifying the components of the vector, a write mask is used for operations that assign new values to the components of a vector variable as specified by a write mask.

The method 700 begins at step 710 where a template is defined for a shading language vector data type. This step parallels step 610 of the method 600, described above. At step 720, a template is defined for swizzled vector data types used in write masking operations. For example, in the illustrative embodiment described above, the cgVectorSwizzle<T, STORAGE, N, SMASK> template is defined on lines 9-33 of FIG. 3. Like the cgVector<T, N> data type, the cgVectorSwizzle<T, STORAGE, N, SMASK> data type is parameterized by a scalar type and N scalar swizzled components based on STORAGE number of stored components. Additionally, the SMASK template parameter encodes a swizzle for a given instantiation of the cgVectorSwizzle data type. In one embodiment, the SMASK parameter specifies components of the swizzled vector to write values for an assignment operation.

At step 730, overloaded operators may be defined that return a cgVectorSwizzle. For example, in the illustrative embodiment described above, the index the assignment operator (=) is overloaded on lines 21-28 of FIG. 3. One of skill in the art will recognize that other operators of the object-oriented programming language may be overloaded to allow assignments to a write masked vector using the same syntax and semantic features of the shading language vector data type.

At step 740, a partial specialization of the shading language vector data type may be defined for vectors with one, two, three and four scalar components. For example, in the illustrative embodiment described above, a partial specialization of the cgVector<T, 2> data type is shown on lines 4-40 of FIG. 4. In this embodiment, the partial specialization includes an anonymous union composed of vector swizzle members; one member for each possible vector swizzle of a one, two, three or four components composed from two scalar elements. When used as a write mask, the SMASK parameter encodes the swizzled ordering of components to use for an assignment operation to the swizzled vector. The name given to each union member matches the ordering of components of the vector to use when the swizzle is used in an operation that assigns values to a swizzled vector. For example, when used as a write mask, the vector swizzle ".yx" on line 15 specifies a write mask used to assign values in the order of the swizzle; namely, the first value of the vector on the right side of the expression is assigned to the "y" component and second value of the vector on the right side of the expression is assigned to the "x" component. In one embodiment, union members that cannot be used as a write mask, are declared as constant value (e.g., using the "const" keyword). Because of this, a compiler error is generated if such a cgVectorSwizzle is used as a write mask.

At step 750, overloaded operators may be defined for the partial specialization that return a swizzled vector data type. Doing so allows these operators to be used in an expression assigning a value to a write masked vector. This may include overloading binary operators such as the addition (+) subtraction (−) operators and unary operators such as the negation (!) and increment (++) operators, etc. For example, the expression on line 18 of FIG. 2 (bar.zw=foo.xz+bar.zw) uses the assignment operator (=) to assign the result of a vector addition to write masked "bar" vector. Both the (=) and (+) operators are overloaded to return vector swizzle data types in order to allow expressions such as this. In one embodiment, a version of each unary operator may also be provided allowing a vector data type of cgVectorSwizzle<T, N, SMASK> to call the unary operator. For example, overloading the increment (++) operator allows the statement of "bar.zw++." This statement increments the z and w components of the "bar" vector. For binary operators, versions of each operator may be provided to account for the different possible combinations of a vector data type, a swizzled vector data type, and a scalar component type stored in a vector. Lines 16-32 of the program 500 shown in FIG. 5 illustrate examples of the different operand combinations for the assignment operator.

At step 760, the names defined for the vector data type defined at step 710 may be aliased to the names used by a particular shading language vector data type. This step parallels step 660 of the method 600, described above.

In combination with one another, the methods 600 and 700 may be used to provide a shading language vector data type for an object oriented programming language that mirrors both the syntax and semantic features of the vector data types included with shading languages.

In addition to providing a vector data type for an object-oriented programming language supporting swizzling or write masking operations (or both), embodiments of the invention may be used to provide swizzling and write masking operations for matrix data types. For example, a matrix variable may be declared using the syntax of "float4×3 mat;" (a matrix of floating point values with four rows and three columns). To swizzle the elements of such a matrix, a "matrixSwizzle" data type may be defined in a manner similar to the cgVectorSwizzle data type described above. Once defined, swizzle patterns for a matrix data type may specify the ordering of rows and columns for a swizzled matrix. For example, a swizzle pattern of "._22_33" may specify to reorder the first to elements of a matrix using the elements at row 2, column 2 and row 3, column 3. Depending on how this swizzle pattern is used, a float2 vector may be returned, or a matrix with the swizzled components may be returned. Other swizzle patterns for a matrix may be similarly defined. In one embodiment, because the number of swizzle variations for 3×3 or 4×4 matrices is quite large, a header file 135 for a matrix data type may include a less then complete set of matrix swizzles. Additionally, overloaded operators for matrix-vector, vector-matrix and matrix-matrix operations may also be provided in a manner similar to the overloaded operators defined for the cgVector and cgVectorSwizzle data types described above.

Extending an object oriented-programming language using the techniques and methods described herein provides a number of advantages. For example, shader programs may be written, compiled, executed, and, importantly, debugged using the wide variety of development tools available for object-oriented programming languages. Therefore, developers may compose shader programs for the GPU more efficiently and effectively. Similarly, application developers may take advantage of the simple and elegant syntax of the swizzling and write masking operations provided for shading language vector data types when developing software applications in an object-oriented programming language.

Using the template features of the object-oriented programming language allows for a parameterized vector data type. Thus, separate vector data types do not need to be defined for each possible scalar data type. Further, as templates are instantiated only when included in the source code of a program, only the swizzle patterns actually used by a programmer are instantiated and compiled.

Additionally, defining a templated vector data type as a structure that includes an anonymous union allows the components of a vector to be accessed using both the syntax of array indexing (e.g., foo[0]) and the functionally equivalent syntax of accessing member variables (e.g., foo.x). Further, the anonymous union allows a developer to swizzle a vector using the same syntax of a structure member access, without having to define a member variable and consume storage space for each possible vector swizzle. Finally, because the union of vector swizzles share the same memory space storing the actual vector components, the implementation described herein is very efficient both in terms of memory usage and compiled code size.

While the foregoing is directed to embodiments of the present invention, other and further embodiments of the invention may be devised without departing from the basic scope thereof, and the scope thereof is determined by the claims that follow. For example, the vector and vector swizzle templates can both inherit their behavior through a vector usage templated type that is parameterized by a templated vector storage type. This has the advantage of minimizing the required operator overloading because overloading can be expressed as combining the vector usage templated types from which both vectors and swizzled vectors templates are derived. It is also useful to derive two, three, and four component vector and vector swizzles through a plural vector usage templated class. This facilitates unambiguous operator overloading for scalar-vector, vector-scale, and vector-vector operator usage.

We claim:

1. A computer-implemented method for extending an object-oriented programming language to support swizzling operations for a vector data type, comprising:
   defining a first template for a vector data type, wherein the first template is parameterized by a scalar component type and a number of scalar components;
   defining a second template, different from the first template, for a swizzled vector data type, wherein the second template is parameterized by the scalar component type, the number of scalar components, a swizzle component count, and a swizzle mask specifying a selection and ordering of the scalar components for an instance of the vector data type;
   partially specializing the first template for a selected number of scalar components, wherein the partial specialization includes at least a union of instances of the second template; and
   storing the first template and the second template in a memory.

2. The method of claim 1, further comprising overloading operators provided by the object-oriented programming language to perform operations corresponding to operators of the vector data type.

3. The method of claim 1, wherein an array index operator is overloaded to access scalar components of the swizzled vector data type based on the selection and ordering of scalar components encoded in the swizzle mask.

4. The method of claim 1, wherein the first template is partially specialized for vectors of one, two, three or four scalar components.

5. The method of claim 1, wherein the scalar components of a vector are selected from one of an integer, a floating point number and a Boolean data type.

6. The method of claim 1, wherein the object oriented programming language is C++.

7. The method of claim 1, wherein one or more instances of the second template declared for the union is declared as constant.

8. The method of claim 1, wherein the second template is directly parameterized by the scalar component type.

9. The method of claim 1, wherein the second template is indirectly parameterized by the scalar component type.

10. A non-transitory computer readable medium, containing a program for extending an object-oriented programming language to support swizzling operations using a vector data type, wherein the program includes operations for:
   defining a first template for a vector data type, wherein the first template is parameterized by a scalar component type and a number of scalar components;
   defining a second template, different from the first template, for a swizzled vector data type, wherein the second template is parameterized by the scalar component type, the number of scalar components, a swizzle component countm and a swizzle mask specifying a selection and ordering of the scalar components for an instance of the vector data type; and partially specializing the first template for a selected number of scalar components, wherein the partial specialization includes at least a union of instances of the second template.

11. The computer readable medium of claim 10, wherein the operations further comprise overloading operators provided by the object-oriented programming language to perform operations corresponding to operators of the vector data type.

12. The computer readable medium of claim 10, wherein an array index operator is overloaded to access scalar components of a swizzled vector data type based on the selection and ordering of scalar components encoded in the swizzle mask.

13. The computer readable medium of claim 10, wherein the first template is partially specialized for vectors of one, two, three, or four scalar components.

14. The computer readable medium of claim 10, wherein the scalar components of a vector data type is selected from one of an integer, a floating point number, and a Boolean data type.

15. The computer readable medium of claim 10, wherein the object oriented programming language is C++.

16. The computer readable medium of claim 10, wherein one or more instances of the second template declared for the union is declared as constant.

17. The computer readable medium of claim 10, wherein the second template is directly parameterized by the scalar component type.

18. The computer readable medium of claim 10, wherein the second template is indirectly parameterized by the scalar component type.

19. A computing system configured to extend an object-oriented programming language to support swizzling operations using a vector data type, the computer system comprising:
    a processing unit;
    a memory containing a compiler for an object-oriented programming language that supports templates, objects, and operator overloading;
    a header file, wherein the header file includes:
        a definition of first template for a vector data type, wherein the first template is parameterized by a scalar component type and a number of scalar components,
        a definition of a second template, different from the first template, for a swizzled vector data type, wherein the second template is parameterized by the scalar component type, the number of scalar components, a swizzle component count, and a swizzle mask specifying a selection and ordering of scalar components for an instance of the vector data type, and
        a partial specialization of the first template for a selected number of scalar components, wherein the partial specialization includes at least a union of instances of the second template.

20. The computing system of claim 19, wherein the header file further includes overloaded operators used to perform operations using the vector data type corresponding to operators of the vector data type.

21. The computing system of claim 19, wherein an array index operator is overloaded to access scalar components of the templated vector data type based on the selection and ordering of scalar components encoded in the swizzle mask.

22. The computing system of claim 19, wherein the first template is partially specialized for vectors of one, two, three, or four scalar components.

23. The computing system of claim 19, wherein the scalar components of a vector are selected from one of an integer, a floating point number, and a Boolean data type.

24. The computing system of claim 19, wherein the object oriented programming language is C++.

25. The computing system of claim 19, wherein the second template is directly parameterized by the scalar component type.

26. The computing system of claim 19, wherein the second template is indirectly parameterized by the scalar component type.

* * * * *

UNITED STATES PATENT AND TRADEMARK OFFICE
CERTIFICATE OF CORRECTION

| | | |
|---|---|---|
| PATENT NO. | : 8,010,944 B1 | |
| APPLICATION NO. | : 11/608764 | |
| DATED | : August 30, 2011 | |
| INVENTOR(S) | : Mark J. Kilgard and Cass W. Everitt | |

It is certified that error appears in the above-identified patent and that said Letters Patent is hereby corrected as shown below:

Column 16, Claim 10, line 65 please delete "countm" and add --count,--.

Signed and Sealed this
Twenty-ninth Day of November, 2011

David J. Kappos
*Director of the United States Patent and Trademark Office*